United States Patent
Lintz et al.

(10) Patent No.: US 11,842,428 B2
(45) Date of Patent: Dec. 12, 2023

(54) SYSTEM FOR GEOSPATIAL MAPPING OF CEMETERY PROPERTIES

(71) Applicant: NorthStar Memorial Group, LLC, Houston, TX (US)

(72) Inventors: Joshua P. Lintz, Carmel-by-the-Sea, CA (US); David Montgomery, Ladera Ranch, CA (US)

(73) Assignee: NorthStar Memorial Group, LLC, Houston, TX (US)

( * ) Notice: Subject to any disclaimer, the term of this patent is extended or adjusted under 35 U.S.C. 154(b) by 312 days.

(21) Appl. No.: 17/099,651

(22) Filed: Nov. 16, 2020

(65) Prior Publication Data

US 2021/0074040 A1    Mar. 11, 2021

Related U.S. Application Data

(63) Continuation of application No. 15/263,096, filed on Sep. 12, 2016, now Pat. No. 10,839,569.

(60) Provisional application No. 62/290,856, filed on Feb. 3, 2016, provisional application No. 62/295,946, filed on Feb. 16, 2016.

(51) Int. Cl.
*G06T 11/20* (2006.01)
*G06Q 50/16* (2012.01)
*G06Q 30/0283* (2023.01)
*G06T 11/60* (2006.01)

(52) U.S. Cl.
CPC ........ *G06T 11/206* (2013.01); *G06Q 30/0283* (2013.01); *G06Q 50/16* (2013.01); *G06T 11/203* (2013.01); *G06T 11/60* (2013.01)

(58) Field of Classification Search
CPC ...... G06T 11/206; G06T 11/203; G06T 11/60; G06Q 30/0283; G06Q 50/16
See application file for complete search history.

(56) References Cited

U.S. PATENT DOCUMENTS

| | | | | |
|---|---|---|---|---|
| 5,745,751 A | * | 4/1998 | Nelson | G06T 11/206 707/921 |
| 6,268,858 B1 | * | 7/2001 | Nathman | G06T 11/203 701/454 |
| 6,665,840 B1 | * | 12/2003 | Wiley | G06T 11/203 345/619 |

(Continued)

*Primary Examiner* — Luis A Martinez Borrero
(74) *Attorney, Agent, or Firm* — Nielsen IP Law LLC

(57) ABSTRACT

A cemetery geospatial mapping system and methods are provided for interactive map-based searching of cemetery properties. The cemetery geospatial mapping system comprises a mapping tools system that includes a component systems package. The component systems package comprises a mapping system that enables end-users to add GPS coordinates to cemetery property records, automates mapping and overlaying of the cemetery properties onto satellite imagery, and enables the end-users to visually interact with information associated with the cemetery properties. A dynamic pricing system uses machine-learning algorithms to analyze data so as to provide the end-users with an optimal price recommendation for each property and unit of inventory. The dynamic pricing system maximizes profits based on predefined characteristics associated with the properties and units of inventory. A host site is stored on an application server system and accessible to the end-users by way of a communications network, such as the Internet.

18 Claims, 2 Drawing Sheets

(56) References Cited

U.S. PATENT DOCUMENTS

| | | | |
|---|---|---|---|
| 7,003,155 B2* | 2/2006 | Walton | G06T 11/203 382/242 |
| 7,152,022 B1* | 12/2006 | Joshi | G06T 11/203 703/2 |
| 7,426,483 B1* | 9/2008 | Dorward | G06Q 30/02 705/26.8 |
| 8,589,202 B2* | 11/2013 | Nielsen | G06T 3/00 705/7.11 |
| 8,655,106 B2* | 2/2014 | Den Herder | G06Q 30/0206 382/286 |
| 8,665,106 B2 | 3/2014 | Heidvall | |
| 9,064,341 B2* | 6/2015 | Hultquist | G01C 21/3667 |
| 9,098,870 B2* | 8/2015 | Meadow | G06T 17/05 |
| 9,195,998 B2* | 11/2015 | Den Herder | G06Q 30/0205 |
| 9,200,469 B1* | 12/2015 | Mindrum | E04H 13/003 |
| 9,208,593 B1* | 12/2015 | Asher | G06T 11/40 |
| 9,311,397 B2* | 4/2016 | Meadow | G06Q 30/0629 |
| 10,346,924 B1* | 7/2019 | Engelhorn | G06Q 30/0623 |
| 10,839,569 B2* | 11/2020 | Lintz | G06T 11/00 |
| 10,991,134 B2* | 4/2021 | Park | G06T 11/203 |
| 2002/0065739 A1* | 5/2002 | Florance | G06Q 30/06 705/26.43 |
| 2004/0085443 A1* | 5/2004 | Kallioniemi | G06V 20/693 348/135 |
| 2004/0128215 A1* | 7/2004 | Florance | G06Q 10/087 705/28 |
| 2005/0203768 A1* | 9/2005 | Florance | G06Q 50/16 701/438 |
| 2006/0184519 A1* | 8/2006 | Smartt | G06F 16/2264 |
| 2006/0294062 A1* | 12/2006 | Folchetti | G06Q 30/00 |
| 2007/0273558 A1* | 11/2007 | Smith | G08G 1/0962 340/995.1 |
| 2008/0059889 A1* | 3/2008 | Parker | G06F 16/29 715/748 |
| 2008/0106598 A1* | 5/2008 | Silva | H04N 7/18 348/E7.084 |
| 2008/0109742 A1* | 5/2008 | VanAnden | G10H 1/0025 715/765 |
| 2008/0120129 A1* | 5/2008 | Seubert | G06Q 40/125 705/305 |
| 2008/0295038 A1* | 11/2008 | Helfman | G06F 16/44 715/853 |
| 2008/0300911 A1* | 12/2008 | Dorward | G06Q 30/02 705/1.1 |
| 2009/0027418 A1* | 1/2009 | Maru | G06F 16/29 345/629 |
| 2009/0132316 A1* | 5/2009 | Florance | G06Q 30/06 715/810 |
| 2009/0142002 A1* | 6/2009 | Middendorf | G06T 17/05 382/286 |
| 2010/0205536 A1* | 8/2010 | Nielsen | G06Q 10/06313 726/28 |
| 2011/0007076 A1* | 1/2011 | Nielsen | G06F 16/2365 345/441 |
| 2011/0181598 A1* | 7/2011 | O'Neall | G06T 11/206 345/440 |
| 2011/0214050 A1* | 9/2011 | Stambaugh | G06F 16/26 715/234 |
| 2012/0254156 A1* | 10/2012 | Rao | G06Q 10/00 707/722 |
| 2013/0036031 A1* | 2/2013 | Hutchinson | G06Q 50/16 705/30 |
| 2013/0097544 A1* | 4/2013 | Parker | G06F 16/248 715/771 |
| 2013/0101234 A1* | 4/2013 | Den Herder | G06Q 50/16 382/286 |
| 2013/0103595 A1* | 4/2013 | Berry | G06Q 30/0283 705/306 |
| 2013/0182108 A1* | 7/2013 | Meadow | G06T 17/05 348/143 |
| 2013/0194303 A1* | 8/2013 | Nielsen | G09B 29/00 345/632 |
| 2013/0321422 A1* | 12/2013 | Pahwa | G06T 11/203 345/428 |
| 2014/0019302 A1* | 1/2014 | Meadow | G06Q 30/0623 705/26.61 |
| 2014/0132623 A1* | 5/2014 | Holten | G06T 11/001 345/593 |
| 2014/0211015 A1* | 7/2014 | Meadow | G06F 16/58 348/148 |
| 2014/0279573 A1* | 9/2014 | Coats | G06Q 30/0278 705/306 |
| 2015/0161719 A1* | 6/2015 | Abhyanker | G06Q 30/0645 705/307 |
| 2015/0186953 A1* | 7/2015 | Gross | G06T 1/0007 705/14.58 |
| 2016/0027051 A1* | 1/2016 | Gross | G06V 20/20 705/14.54 |
| 2016/0048934 A1* | 2/2016 | Gross | G06V 10/40 705/313 |
| 2016/0078573 A1* | 3/2016 | Den Herder | G06Q 30/0205 705/7.34 |
| 2016/0086359 A1* | 3/2016 | Eisenmenger | G06T 11/203 345/428 |
| 2016/0217537 A1* | 7/2016 | Childs | G06F 16/444 |
| 2017/0091993 A1* | 3/2017 | Andrew | G06F 3/04812 |
| 2017/0094165 A1* | 3/2017 | Meadow | H04N 7/18 |
| 2017/0221239 A1* | 8/2017 | Lintz | G06T 11/60 |
| 2017/0360027 A1* | 12/2017 | Vilinskis | A01M 1/026 |
| 2018/0052572 A1* | 2/2018 | Bemel-Benrud | G06F 16/29 |
| 2018/0330390 A1* | 11/2018 | Malaviya | G06Q 30/0202 |

* cited by examiner

SYSTEM FOR GEOSPATIAL MAPPING OF CEMETERY PROPERTIES

CROSS-REFERENCE

This application claims the benefit of U.S. patent application Ser. No. 15/263,096 filed on Sep. 12, 2016 and U.S. Provisional Patent Application No. 62/290,856, filed Feb. 3, 2016, titled "System for Geospatial Mapping of Cemetery Property," and U.S. Provisional Patent Application No. 62/295,946, filed Feb. 16, 2016, titled "System for Geospatial Mapping of Cemetery Property," each of which is incorporated herein by reference in its entirety.

FIELD

The field of the present disclosure generally relates to cemetery property listings. More particularly, the field of the invention relates to a cemetery geospatial mapping system and methods that provide users with interactive map-based searching of cemetery property listings within the cemetery, cremation, and funeral industries.

BACKGROUND

Cemeteries and different burial places have been contemplated from the beginning of time. The human race has always desired the best ways to respect and bury their dead. Final disposition preferences have changed over the centuries from primarily full-body casketed burial to the increasing popularity of cremation. The type of burials too have changed, with options ranging from full-body casketed burial, full-body entombment, cremated remains inurnment, burial or scattering, to more elaborate forms of burying, enclosing or memorializing the deceased, and the like.

Today, the most common types of final disposition are cremation and full-body casketed burial or entombment. In more recent times, cremation has become increasingly popular. The cremated human remains are typically placed inside a cinerary urn for permanent storage and presentation. Typically, urns are inurned at cemeteries inside a columbarium, mausoleum, in-ground burial plot, or housed within various types of memorialization product and property. Alternatively, families may choose to scatter the cremated remains or store them at their home or the like. Alternatively, full-body disposition involves the burial or entombment of a full body; and includes the use of a casket, a burial plot, and grave-marking tombstone or memorial. The human remains are prepared for burial, entombment or inurnment, placed in a casket or cinerary urn, and either lowered into the ground, entombed in a mausoleum, inurned in a columbarium or the like. A gravestone or memorial is placed on top of or affixed to the burial or memorial site to mark where the deceased is located or memorialized. Cemeteries and memorial parks typically are parks with trees, grass, and other park-like structures. Some cemeteries are located on church grounds or other holy sites. In some instances, cremation remains may also be placed at these similar locations.

However, few significant developments have been made within the cremation, cemetery, and funeral industries for improving services available to customers during searching for and purchasing of cemetery property. In the real estate industry, for example, many properties are listed for sale online, and customers may perform map-based searches and view information pertaining to various properties. In the case of cemetery properties, little information beyond the locations of various cemeteries and the like is available online. Such a lack of information availability not only hinders optimal purchasing decisions, thus reducing the quality of service available to customers, but also limits potential sales within the cemetery, cremation, and funeral industries.

What is needed, therefore, is a mobile and online system for geospatial property listing data, dynamic interactive data visualizations, and dynamic pricing for use as a sales tool within the cemetery, cremation, and funeral industries. Provided herein are systems and methods that meet the foregoing needs.

SUMMARY

Provided herein in some embodiments is a cemetery geospatial mapping system including a mapping tools system, a host site, and a database server system. The mapping tools system can include a component systems package including a mapping system configured to add GPS coordinates to cemetery properties by way of automated overlaying and mapping the cemetery properties onto satellite imagery with a mapping algorithm. The mapping system can be further configured to enable a multiplicity of end-users to visually interact with information about the cemetery properties and manually adjust the automated overlaying and mapping if needed to adjust the GPS coordinates. The host site can be stored on a non-transient machine-readable medium of an application server system. The host site can be accessible to the multiplicity of end-users by way of a communications network, and the host site can be configured to provide the multiplicity of end-users with access to the mapping tools system by way of an interface. The database server system can include a non-transient machine-readable medium for storing information needed during the operation of the mapping tools system.

These and other features provided herein can be better understood with reference to the drawings, description, and claims, all of which form the disclosure of this patent application.

DRAWINGS

The drawings refer to embodiments of the present disclosure in which.

Figure 1:
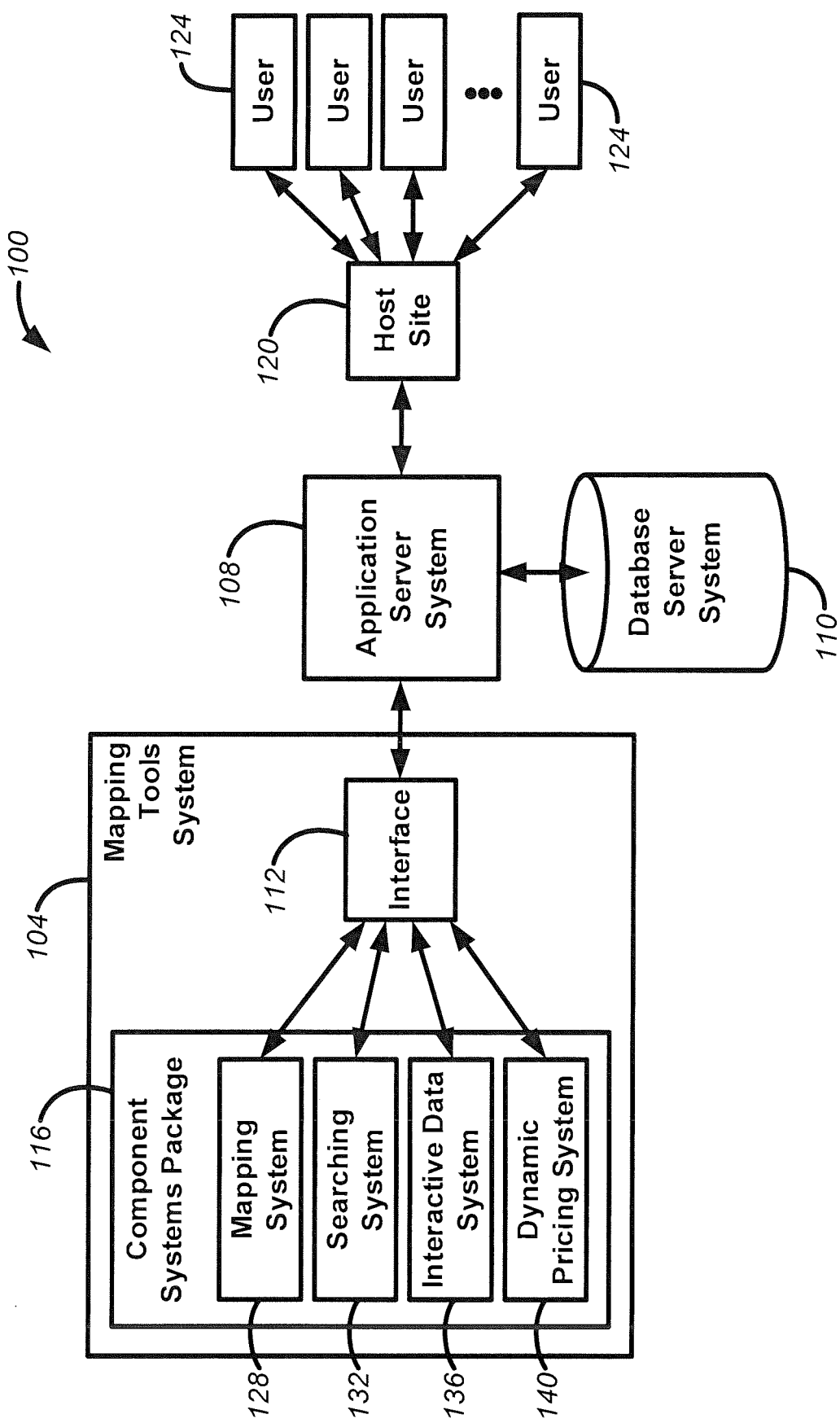
FIG. 1 is a schematic illustrating a cemetery geospatial mapping system in accordance with some embodiments.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first property," may be made. However, the specific numeric reference should not be interpreted as a literal sequential order but rather interpreted that the "first property" is different than a "second property." Thus, the specific details set forth are merely exemplary. The specific details may be varied from and still be contemplated to be within the spirit and scope of the present disclosure. The term "coupled" includes one component connected either directly to another component or indirectly to the other component through one or more intervening components. The terms "about," "approximately," or "substantially" for any numerical values or ranges indicate a suitable dimensional tolerance that allows the part or collection of components to function for its intended purpose as described herein. The term "property," for example, "cemetery property," can include in-ground cemetery properties such as graves, as well as properties in buildings such as mausoleums and crypts. Properties including columbarium niches and the like for inurnment are also included in the foregoing properties.

In general, the present disclosure describes a cemetery geospatial mapping system and methods for interactive map-based searching of cemetery properties within the cemetery, cremation, and funeral industries. The cemetery geospatial mapping system comprises a mapping tools system which includes a component systems package. The component systems package comprises a mapping system configured to enable a multiplicity of end-users to add GPS coordinates to cemetery property records, automate mapping, and overlaying the cemetery properties onto satellite imagery basemaps, and enable the end-users to visually interact with information about the cemetery properties. A dynamic pricing system is configured to use machine-learning algorithms to analyze data so as to provide the multiplicity of end-users with an optimal price recommendation for each property and unit of inventory. The dynamic pricing system may be configured to maximize profits based on predefined characteristics associated with the properties (e.g., physical location, risks associated with adverse natural events, etc.), units of inventory, pre-need pricing, at-need pricing, and the like. A host site is accessible to the multiplicity of end-users by way of a communications network, such as the Internet. The host site is stored on a non-transient machine-readable medium of an application server system and configured to provide the multiplicity of end-users with access to the mapping tools system by way of an interface. A database server system comprises a non-transient machine-readable medium for storing information needed during the operation of the mapping tools system.

FIG. 1 is a schematic illustrating an exemplary embodiment of a cemetery geospatial mapping system 100 in accordance with the present invention. The cemetery geospatial mapping system 100 comprises a mapping tools system 104 stored on a non-transient machine-readable medium (i.e., a memory) of an application server system 108. The cemetery geospatial mapping system 100 further comprises a database server system 110 which stores any information or data that may be needed during the operation of the mapping tools system 104.

The mapping tools system 104 further comprises an interface 112 which provides access to a component systems package 116. As illustrated in FIG. 1, a host site 120 provides a multiplicity of end-users 124 access to the application server system 108 by way of a communications network, such as the Internet. It is envisioned that a portion of the multiplicity of end-users 124 may comprise cemetery personnel wishing to list cemetery properties for sale to an online audience. A remaining portion of the end-users 124 may be potential customers in the market for services within the cemetery, cremation, and funeral industries. Preferably, each of the end-users 124 creates a user profile by utilizing applications stored on the memory of the application server system 108 and the services provided by the mapping tools system 104.

In one embodiment, the component systems package 116 is stored on the memory of the application server system 108, and the interface 112 is a software application which comprises a portion of the mapping tools system 104, thereby providing access to the component systems package 116. In another embodiment, the component systems package 116 may be stored on the memory of the database server system 110, and the interface 112 enables interaction between the application server system 108 and the component systems package 116 on the database server system 110. In another embodiment, the component systems package 116 may be services operated by one or more third-party service providers. In this embodiment, the interface 112 may comprise a connection over the communications network, such as an Internet connection, whereby the application server system 108 may send requests to, and receive services from the one or more third-party service providers.

In the embodiment illustrated in FIG. 1, the component systems package 116 comprises services that are provided to the end-users 124, including, but not necessarily limited to a mapping system 128, a searching system 132, an interactive data system 136, and a dynamic pricing system 140. As described herein, the cemetery geospatial mapping system 100 generally provides the end-users 124 with automated mapping of cemetery properties, map-based searching, visual property selection, and dynamic pricing so as to optimize price, maximize profitability and enhance the customer experience of the end-users 124 within the cemetery, cremation, and funeral industries.

The mapping system 128 comprises an interface that enables the end-users 124, preferably cemetery personnel, to add GPS coordinates to cemetery property records (e.g., graves) by way of automated overlaying of these cemetery properties onto the latest satellite imagery. As will be appreciated, a cemetery section may be defined as a group of properties arranged into a grid. The mapping system 128 includes algorithms configured to optimally position cemetery properties in their correct locations within a cemetery section. The mapping system 128 is configured to utilize several different property address schemes for the purpose of overlaying the properties. In some embodiments, however, when the addressing scheme of a particular section does not include enough information for an automated layout of properties within the section, the mapping system 128 may prompt the end-user 124 for additional information. As such, the mapping system 128 comprises various tools that enable the end-user 124 to input additional information needed to position the properties within the section. Further, it will be appreciated, that not all cemetery properties are arranged into rectangular grids. To this end, in one embodiment, the mapping system 128 comprises tools whereby the end-users 124 may create curves so as to layout properties within curved sections.

In some embodiments, the mapping system 128 includes features that facilitate moving one or more properties, or one or more sections, so as to facilitate simultaneously overlaying a great number of cemetery property records onto satellite imagery. The features included within the mapping system 128 enable the end-users 124 to rotate properties as well as to translate the properties in cardinal directions. In one embodiment, the cardinal directions may comprise north, south, east, and west. In one embodiment, the cardinal directions may be advantageously aligned with a particular section of property, such as a rectangular grid.

Figure 2:
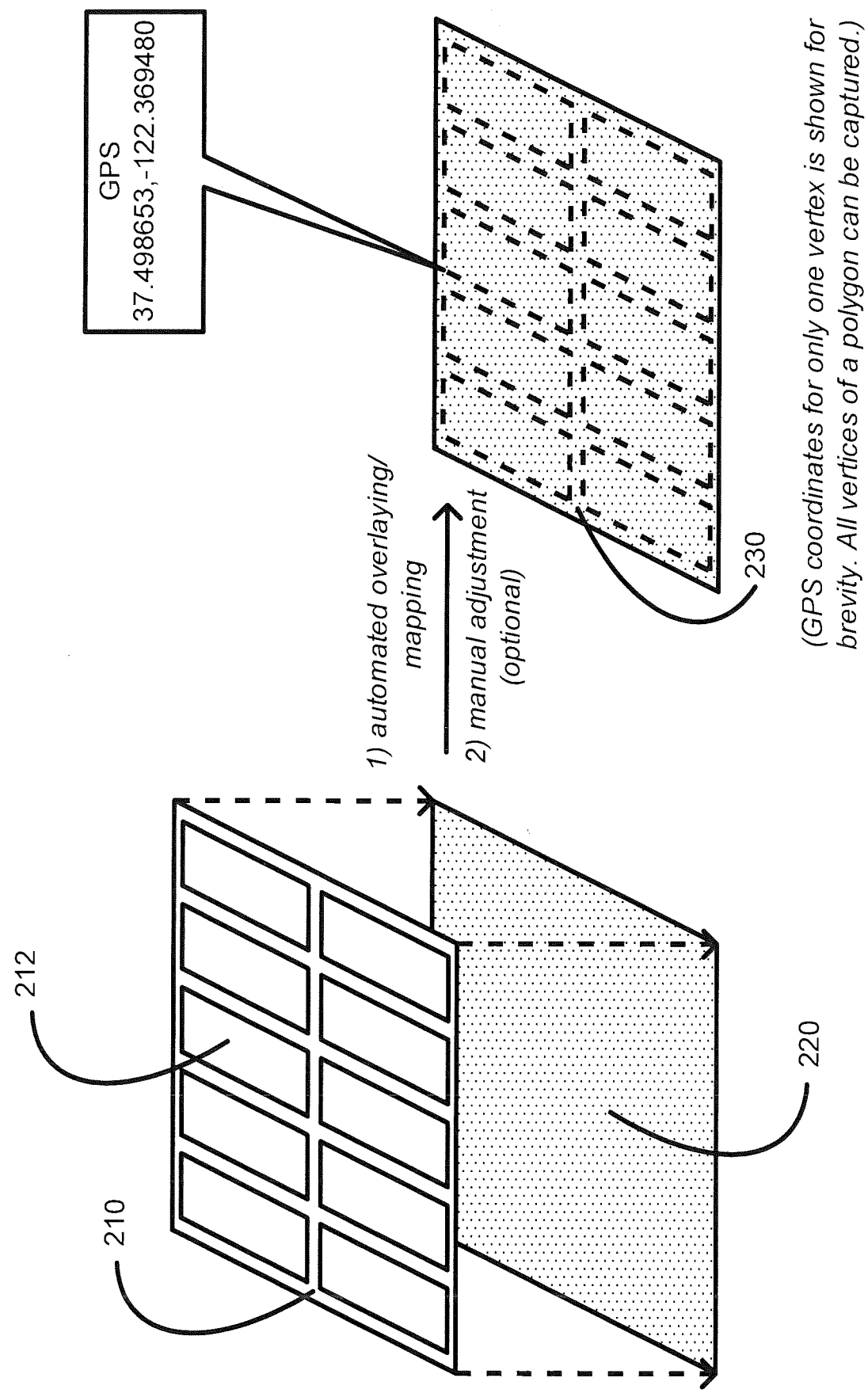
FIG. 2 is a schematic illustrating automated overlaying/mapping a group of cemetery properties in a cemetery section over satellite imagery in accordance with some embodiments.

Adverting briefly to FIG. 2, FIG. 2 is a schematic illustrating an example of automated overlaying/mapping a group of cemetery properties in a cemetery section over satellite imagery. As shown, the mapping system 128 can automatically overlay a cemetery section 210 including one or more cemetery properties (e.g., graves) such as cemetery property 212 onto satellite imagery 220 to provide a map 230 including the cemetery section 210 and the one or more cemetery properties thereof on the satellite imagery 220. One or more GPS coordinates such as the GPS coordinates 37.498653, −122.369480 shown for the cemetery property 212 can be automatically added to the one or more cemetery properties in accordance with the GPS coordinates of the satellite imagery 220. Again, should the addressing scheme for a particular cemetery section not include enough information for an automated layout of the one or more cemetery properties within the particular cemetery section, the mapping system 128 can prompt the end-user 124 for manual adjustment of the automated layout. Manual adjustment can be through additional information provided by the end-user 124. Manual adjustment can additionally or alternatively be through on-screen manipulations by the end-user 124 such as moving the cemetery section 210 or the one or more cemetery properties thereof with a drag-and-drop gesture (e.g., using the end-user's finger; a pointing device such as a mouse; etc.).

Once the properties have been overlaid onto satellite imagery, GPS coordinates for each property may be saved with the property record and stored on the memory of the database server system 110. As will be recognized, a rectangular property typically requires a set of four GPS coordinates. In the case of properties comprising nonrectangular shapes, such as polygons, triangles, ellipses, circles, and the like, the mapping system 128 comprises one or more algorithms configured to facilitate automated overlaying of properties comprising irregular boundaries. In some embodiments, the mapping system 128 comprises tools that enable the end-users 124 to manually outline the properties. In one embodiment, all GPS coordinates associated with a polygonal property may be saved to the property record in the database server system 110. In one embodiment, one GPS coordinate associated with the center of a circular property may be saved to the property record in the database server system 110.

The mapping system 128 preferably incorporates various easements, gaps, strips, and gores (e.g., triangular or odd-shaped strips of land) existing within cemetery sections during overlaying cemetery properties. In some embodiments, however, the mapping system 128 may enable the end-users 124 to create and apply easements, gaps, and gores into the sections, as needed. In some embodiments, the mapping system 128 comprises one or more algorithms configured to maintain the rectangular dimensions of properties adjoining curved property lines, curved right-of-way lines, as well as easement lines. For example, during overlaying a property grid that adjoins a curved right-of-way line, the mapping system 128 maintains the grid and the dimensions of the properties comprising the grid, such as the width and height dimensions of each of the properties, while the end-user 124 rotates and translates the grid relative to the right-of-way line, as needed. Further, where a property grid adjoins a curved property line or a curved right-of-way line, the mapping system 128 ensures that the property grid remains adjoined to the property line or right-of-way during user-induced rotations and translations without an introduction of gaps or gores there between. Further still, the mapping system 128 prevents an encroachment of individual properties onto easements, as well as preventing an introduction of gaps or gores between easement parcels and the property grid during rotating and translating thereof.

In a preferred embodiment, the mapping system 128 utilizes one or more Bezier curve algorithms to accommodate curved property lines, curved parcels lines, curved right-of-way lines, curved easement lines, and the like, based on a specified number of control points. In one embodiment, the Bezier curve algorithm may be implemented by computing a specific row in Pascal's triangle, by way of a custom-n choose-k algorithm, and then using the resultant values as coefficients in the Bezier curve algorithm. The Bezier curve may be mapped by receiving a set of control points, or markers, input by the end-user 124 and then parameterizing lines between subsequent control points. In one embodiment, each of the lines is divided into 100 equidistant segments, by way of a parameter t, thereby forming a set of 100 points, such as, by way of non-limiting example, P1=Bezier(0.01, controlPoints), P2=Bezier(0.02, controlPoints), . . . P100=Bezier(1.0, controlPoints). The set of 100 points, P1 . . . P100, may then be used to create a polyline that is visible to the end-user 124.

In some embodiments, Bezier curves may be parameterized by stacking properties from a first control point along a curve based on a width of the properties input by the end-user 124. In one embodiment, the mapping system 128 comprises an algorithm that may begin by putting P0=Bezier (0, controlPoints), setting tMin=0, tMax=1, and t=(tMin+tMax)/2. The mapping system 128 may then put P1=Bezier (t, controlPoints) and then compare the distance between P0 and P1 with the width of the property input by the end-user 124. If the distance is greater than the property width, then the mapping system 128 puts tMax=t. Alternatively, if the distance is less than the property width, the mapping system 128 sets tMin=t. It is envisioned that the mapping system 128 repeatedly performs the above steps until the following statement is found to be true: absolute_value(distance(P0, P1)-propertyWidth)<0.01, at which point the mapping system 128 then moves on to the next property input by the end-user 124. The mapping system 128 may perform the above steps until n-many points are generated, wherein n=a number of properties to map along the curve. In some embodiments, inputs are tweaked by the mapping system 128 during each run of the algorithm to generate a new point Pk, wherein Pk−1 is taken as a starting point, tMin is a parameter used to generate Pk−1, and tMax is estimated to be the difference between tk−1 and tk−2 (which are used to compute Pk−1 and Pk−2). In another embodiment, the mapping system 128 may further determine whether or not tMax is indeed a true maximum. If tMax is found to be not a true maximum, then the mapping system 128 puts tMin=tMax and tMax=tMax+(tMax−tMin) before performing the steps discussed above.

It will be appreciated by those skilled in the art that during mapping a Bezier curve, it is advantageous to compute the tangent and the normal to the curve for each of the control points. In some embodiments, the mapping system 128 determines the tangent and normal for each of the n-many points discussed above. To this end, the mapping system 128 may be configured to calculate the derivative of a Bezier curve of arbitrary degree, for any number of control points. As will be appreciated, performing the derivative of a Bezier curve of degree d produces a Bezier curve of degree d−1. Thus, for each control point, k, the mapping system 128 performs a computation of the form: Gradient=BezierDerivative(tk, controlPoints), wherein Gradient is a vector of derivatives, given by <dx, dy>. Then, upon taking a sample point S=(Sx, Sy) in the area, which may be the original control point, k, the mapping system 128 may compute a second point of the form: S2=(Sx+dx, Sy+dy). The tangent to the curve may then be obtained by computing an azimuthal bearing from point S to point S2. The mapping system 128 may obtain the normal to the curved by adding 90 degrees to the azimuthal bearing.

In some embodiments, the above-discussed n-many points may be used to represent midpoints, Pk, positioned at the top of each cemetery property. Thus, for each of the k-many cemetery properties, the mapping system 128 may use the midpoint Pk at the top of the property to determine the corner points for the cemetery property. For example, in the case of a rectangular shaped property, the mapping system 128 may compute the corner points nearest the midpoint by way of Pk'=LocationOf(Pk, PropertyWidth/2, −tangent) and Pk"=LocationOf(Pk, PropertyWidth/2, tangent), wherein LocationOf is a geometric algorithm configured to extrapolate a geometric point positioned a given distance along a bearing from an initial point. With the corner points Pk' and Pk" determined, the mapping system 128 may compute the opposite corner points by way of Pk'''=LocationOf(Pk', PropertyLength, normal) and Pk''''=LocationOf(Pk", PropertyLength, normal). Once all the corner points have been determined for the cemetery property, the mapping system 128 may then draw a polyline anchored to the points, Pk'→Pk"→Pk'''→+Pk''''→Pk', such that the rectangular cemetery property is overlaid onto satellite imagery and visible to the end-user 124. Preferably, the corner points of the cemetery property are then converted into geographical locations having latitude and longitude coordinates that are overlaid onto the satellite image.

Moreover, although the cemetery geospatial mapping system 100 generally is configured to operate in an online environment, by way of the communications network, in some embodiments an Offline Mode is provided to the end-users 124. The Offline Mode is configured to enable the end-users 124 to perform one or more of the above-discussed operations by way of a mobile device or a computer while disconnected from the communications network.

Referring again to FIG. 1, the searching system 132 is configured to provide map-based searching tools to the end-users 124, preferably customers seeking services within the cemetery, cremation, and funeral industries. In some embodiments, the searching system 132 facilitates visual property selection in which the end-users 124 may select a cemetery property by clicking with a pointing device, such as a mouse or stylus, within the property overlaying the satellite imagery. In some embodiments, the searching system 132 is configured to provide custom vector tile maps so as to render higher zoomed images more quickly while requiring relatively little storage space. In some embodiments, the searching system 132 may be configured to provide filtering whereby search results are limited by way of various user-selected properties, such as type of cemetery property, price, availability status, property features, and the like. Further, the searching system 132 may be configured to incorporate a searching bias, whereby search results may be prioritized based on at least proximity to the selected cemetery property or similarity to other properties.

The interactive data system 136 is configured to enable the end-users 124 to interact with the map-based information displayed by way of the mapping system 128. For example, the interactive data system 136 may be configured to provide the end-users 124 with directions, such as, by way of non-limiting example, a shortest walking path through a cemetery by using sidewalks and private roads to access selected gravesites, other memorialization property, buildings and facilities. In some embodiments, the interactive data system 136 may be configured to provide dynamic buildings, such as by way of example, highlighting mausoleums, *columbaria*, funeral homes, and the like, so as to provide interactivity to the end-users 124. In some embodiments, the interactive data system 136 may incorporate highlighted sections and polygons overlaying cemetery base-maps so as to enable the end-users 124 to search for specific cemetery properties within a section. Further, the interactive data system 136 may be configured to provide dynamic heat maps comprising visual data associated with various cemetery properties, such as sales volume and trend analysis, pricing, popularity, and the like.

The dynamic pricing system 140 is an artificial intelligence system configured to use machine-learning algorithms to analyze and model statistical data using regression methods, instance-based learning, Bayesian inference, and other methods, so as to provide to the end-users 124 an optimal price recommendation for each property and unit of inventory, such that optimal revenue for cemetery property listings is generated. For example, the dynamic pricing system 140 may be configured to help a cemetery charge more during periods of high demand, as well as capturing an optimal amount of sales transactions during periods of relatively little demand. In some embodiments, dynamic pricing may be configured to maximize profits based on at least similarity, such as property type, square footage, capacity, recent sales, proximity sales, pricing, location, proximity to natural or man-made features, risks associated with adverse natural events, and other signals of the like. In some embodiments, the dynamic pricing system 140 may be configured to automatically refine the weight the tool gives to these signals, checking price tips against outcomes and changing conditions of supply, demand, and the like, to ultimately learn and improve its ability to recommend optimal pricing. As will be appreciated, the characteristic of each property may be stored in the database server system 110. In one embodiment, the dynamic pricing system 140 is configured to allow the user to influence the computer's thought process by enabling cemetery personnel to manually set the price of each cemetery property within the database server system 110.

As such, provided herein in some embodiments is a cemetery geospatial mapping system including a mapping tools system, a host site, and a database server system. The mapping tools system can include a component systems package including a mapping system configured to add GPS coordinates to cemetery properties by way of automated overlaying and mapping the cemetery properties onto satellite imagery with a mapping algorithm. The mapping system can be further configured to enable a multiplicity of end-users to visually interact with information about the cemetery properties and manually adjust the automated overlaying and mapping if needed to adjust the GPS coordinates. The host site can be stored on a non-transient machine-readable medium of an application server system. The host site can be accessible to the multiplicity of end-users by way of a communications network, and the host site can be configured to provide the multiplicity of end-users with access to the mapping tools system by way of an interface. The database server system can include a non-transient machine-readable medium for storing information needed during the operation of the mapping tools system.

In some embodiments of the cemetery geospatial mapping system, the component systems package is stored on a memory of the application server system, and the interface is a software application that comprises a portion of the mapping tools system and provides access to the component systems package. In some embodiments, the component systems package is stored on a memory of the database server system, and the interface provides communication between the application server system and the component systems package on the database server system. In some embodiments, the component systems package comprises one or more services operated by one or more third-party service providers, and the interface comprises a connection over the communications network, whereby the application server system sends requests to, and receives services from, the one or more third-party service providers. In some embodiments, the mapping system is configured to optimally position the cemetery properties in their correct locations within a cemetery section comprising a group of the cemetery properties arranged into a grid. In some embodiments, the mapping system is configured to utilize several different property address schemes coupled with additional input by the multiplicity of end-users. In some embodiments, the mapping system is configured to facilitate an end-user simultaneously overlaying one or more cemetery property records onto the satellite imagery. In some embodiments, the mapping system enables rotating and translating of the one or more cemetery properties in cardinal directions. In some embodiments, the mapping system is configured to use one or more Bezier curve algorithms to accommodate curved property lines, curved parcels lines, curved right-of-way lines, or curved easement lines, based on a specified number of control points. In some embodiments, the mapping system is configured to use a midpoint at the top of the cemetery property to determine the corner points for the cemetery property. In some embodiments, the mapping system is configured to display a polyline anchored to the corner points, such that the cemetery property is visibly overlaid onto the satellite imagery. In some embodiments, the mapping system is configured to associate geographical locations with the corner points, the geographical locations comprising latitude and longitude coordinates that are determined by way of the satellite imagery. In some embodiments, the component systems package comprises a searching system, an interactive data system, and a dynamic pricing system. In some embodiments, the searching system is configured to provide interactive map-based searching of cemetery properties and visual property selection whereby one or more cemetery properties is selected by clicking with a pointing device within the one or more cemetery properties overlaying the satellite imagery. In some embodiments, the searching system is configured to incorporate a searching bias, whereby search results may be prioritized based on at least proximity to a selected cemetery property. In some embodiments, the interactive data system is configured to provide dynamic heat maps comprising visual data associated with selected cemetery properties and data sets. In some embodiments, the dynamic pricing system is configured to use machine-learning algorithms to analyze data so as to provide an optimal price for each cemetery property and unit of inventory. In some embodiments, the dynamic pricing system is configured to maximize profits based on one or more predefined characteristics associated with each property and unit of inventory.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:
1. A mapping tools system, comprising:
a component systems package comprising a mapping system configured to add global positioning system (GPS) coordinates to geospatial property listing data of at least one or more of cemetery properties and cemetery property records and
to use one or more Bezier curve algorithms to accommodate curved property lines, curved parcels lines, curved right-of-way lines, or curved easement lines, based on a specified number of control points;
a mapping algorithm automated to overlay and map the geospatial property listing data onto satellite imagery;
an interface configured to provide multiplicity of end-users with access to the component systems package, the interface and the mapping algorithm are configured by the mapping system, wherein the mapping system is further configured to enable the multiplicity of end-users to visually interact with information about the geospatial property listing data and manually adjust the automated overlay and map if needed to adjust the UPS coordinates;
a host site accessible to the multiplicity of end-users by way of a communications network and the interface, the host site being stored on a non-transient machine-readable medium of an application server system; and
a database server system comprising a non-transient machine-readable medium for storing information needed during operation of the mapping tools system.

2. The mapping tools system of claim 1,
wherein the component systems package is stored on a memory of the application server system, the interface being a software application that comprises a portion of the mapping tools system and provides access to the component systems package;
wherein the component systems package is stored on a memory of the database server system, the interface providing communication between the application server system and the component systems package on the database server system; and
wherein the component systems package comprises one or more services operated by one or more third-party service providers.

3. The mapping tools system of claim 1,
wherein the interface comprises a connection over the communications network, whereby the application server system sends requests to, and receives services from, the one or more third-party service providers.

4. The mapping tools system of claim 1,
wherein the mapping system is configured to position cemetery properties in known locations within a cemetery section comprising a group of the cemetery properties arranged into a grid;

wherein the mapping system is configured to utilize several different property address schemes coupled with additional input by the multiplicity of end-users;

wherein the mapping system is configured to facilitate an end-user simultaneously overlaying one or more cemetery property records onto the satellite imagery; and wherein the mapping system enables rotating and translating of the one or more cemetery properties in cardinal directions.

5. The mapping tools system of claim 1,
wherein the mapping system is configured to use a midpoint at the top of the cemetery property to determine the corner points for the cemetery property.

6. The mapping tools system of claim 5,
wherein the mapping system is configured to display a polyline anchored to the corner points, such that the cemetery property is visibly overlaid onto the satellite imagery; and
wherein the mapping system is configured to associate geographical locations with the corner points, the geographical locations comprising latitude and longitude coordinates that are determined by way of the satellite imagery.

7. The mapping tools system of claim 1, further comprising
a searching system configured to provide interactive map-based searching of cemetery properties and visual property selection whereby one or more cemetery properties is selected by clicking with a pointing device within the one or more cemetery properties overlaying the satellite imagery,
wherein the searching system is configured to incorporate a searching bias, whereby search results may be prioritized based on at least proximity to a selected cemetery property.

8. The mapping tools system of claim 1, further comprising
an interactive data system configured to provide dynamic heat maps comprising visual data associated with selected cemetery properties and data sets; and
a dynamic pricing system configured to use machine-learning algorithms to analyze data so as to provide a price for each cemetery property and unit of inventory,
wherein the dynamic pricing system is configured to calculate profits based on one or more predefined characteristics associated with each property and unit of inventory.

9. A method of a mapping tools system used as a sales tool in a funeral industry, comprising:
adding global positioning system (GPS) coordinates to geospatial property listing data with a component systems package, the component systems package including a mapping system, wherein the geospatial property listing data includes at least one or more of cemetery properties and cemetery property records;
automatically overlaying and mapping the geospatial property listing data onto satellite imagery with a mapping algorithm of the mapping system, the mapping system configured to use one or more Bezier curve algorithms to accommodate curved property lines, curved parcels lines, curved right-of-way lines, or curved easement lines, based on a specified number of control points;
enabling multiplicity of end-users to visually interact with information about the geospatial property listing data with an interface of the mapping system, the interface is configured to provide the multiplicity of end-users with access to the component systems package, wherein the mapping system is further configured to manually adjust the automated overlaying and mapping when adjustment of the GPS coordinates are needed;
positioning the cemetery properties of the geospatial property listing data in known locations within a cemetery section comprising a group of the cemetery properties arranged into a grid;
providing the multiplicity of end-users access to a host site by way of a communications network and the interface, the host site being stored on a non-transient machine-readable medium of an application server system; and
storing information used during operation of the mapping tools system with a database server system that comprises a non-transient machine-readable medium.

10. The method of claim 9,
wherein the component systems package comprises a searching system, an interactive data system, and a dynamic pricing system.

11. The method of claim 9,
wherein the component systems package is stored on a memory of the application server system, the interface being a software application that comprises a portion of the mapping tools system and provides access to the component systems package;
wherein the component systems package is stored on a memory of the database server system, the interface providing communication between the application server system and the component systems package on the database server system; and
wherein the component systems package comprises one or more services operated by one or more third-party service providers.

12. The method of claim 9,
wherein the interface comprises a connection over the communications network, whereby the application server system sends requests to, and receives services from, the one or more third-party service providers.

13. The method of claim 9,
wherein the mapping system is configured to utilize several different property address schemes coupled with additional input by the multiplicity of end-users;
wherein the mapping system is configured to facilitate an end-user simultaneously overlaying one or more cemetery property records onto the satellite imagery; and
wherein the mapping system enables rotating and translating of the one or more cemetery properties in cardinal directions.

14. The method of claim 9,
wherein the mapping system is configured to use a midpoint at the top of the cemetery property to determine the corner points for the cemetery property.

15. The method of claim 14,
wherein the mapping system is configured to display a polyline anchored to the corner points, such that the cemetery property is visibly overlaid onto the satellite imagery; and
wherein the mapping system is configured to associate geographical locations with the corner points, the geographical locations comprising latitude and longitude coordinates that are determined by way of the satellite imagery.

16. The method of claim 9,
wherein the searching system is configured to provide interactive map-based searching of cemetery properties and visual property selection whereby one or more cemetery properties is selected by clicking with a pointing device within the one or more cemetery properties overlaying the satellite imagery; and
wherein the searching system is configured to incorporate a searching bias, whereby search results may be prioritized based on at least proximity to a selected cemetery property.

17. The method of claim 9,
wherein the interactive data system is configured to provide dynamic heat maps comprising visual data associated with selected cemetery properties and data sets.

18. The method of claim 9,
wherein the dynamic pricing system is configured to use machine-learning algorithms to analyze data so as to provide a price for each cemetery property and unit of inventory; and
wherein the dynamic pricing system is configured to calculate profits based on one or more predefined characteristics associated with each property and unit of inventory.

* * * * *

UNITED STATES PATENT AND TRADEMARK OFFICE
CERTIFICATE OF CORRECTION

| | | |
|---|---|---|
| PATENT NO. | : 11,842,428 B2 | Page 1 of 1 |
| APPLICATION NO. | : 17/099651 | |
| DATED | : December 12, 2023 | |
| INVENTOR(S) | : Joshua P. Lintz and David Montgomery | |

It is certified that error appears in the above-identified patent and that said Letters Patent is hereby corrected as shown below:

In the Claims

Claim 1, Column 10, Line 37, delete: "UPS" and insert --GPS--

Signed and Sealed this
Ninth Day of January, 2024

*Katherine Kelly Vidal*

Katherine Kelly Vidal
*Director of the United States Patent and Trademark Office*